(122.) 2 Sheets--Sheet 1.
A. A. WEIDEMEYER.
Improvement in Car Brakes.
No. 122,419. Patented Jan. 2, 1872.
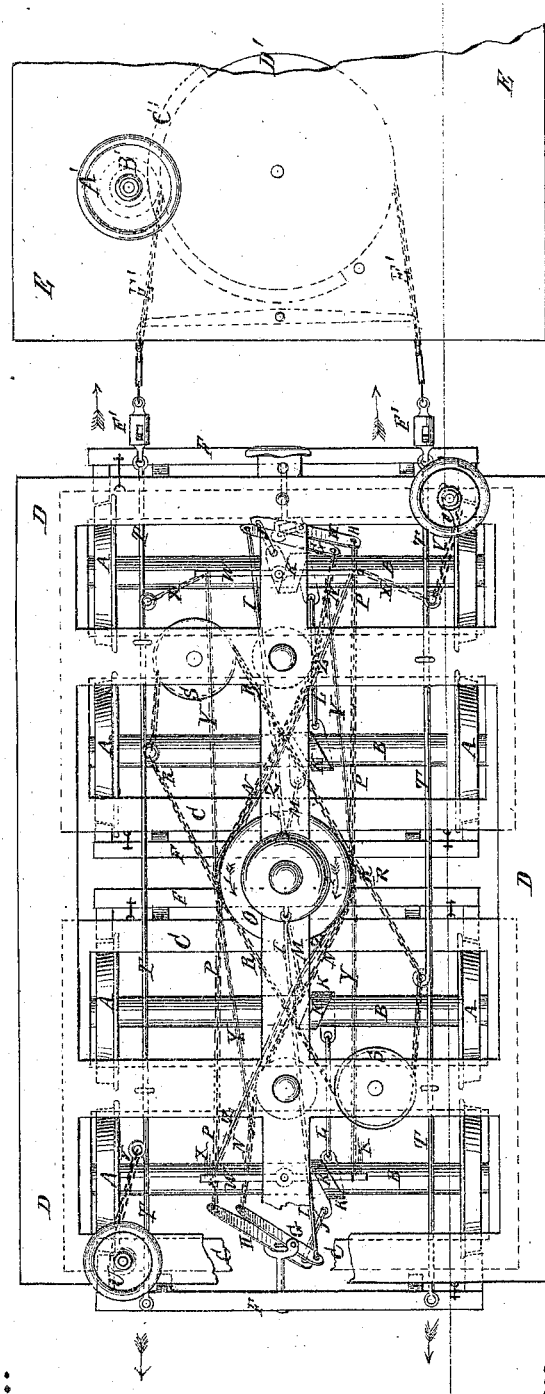
Witnesses:
A. W. Almqvist
Geo. W. Mabee
Inventor:
Albert A. Weidemeyer
Per
Munn & Co.
Attorneys.

(122.)
A. A. WEIDEMEYER.
Improvement in Car Brakes.
No. 122,419.    Patented Jan. 2, 1872.
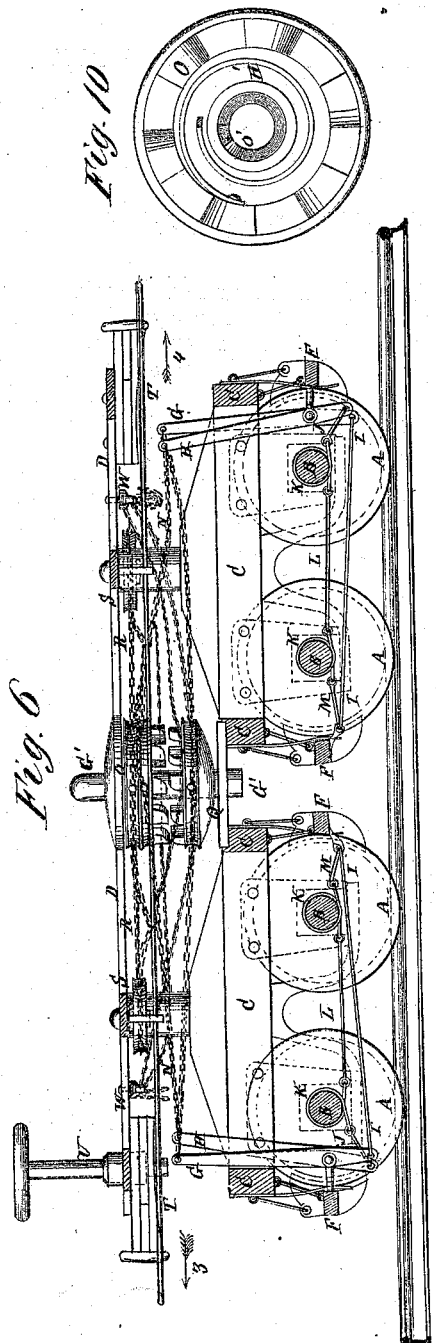
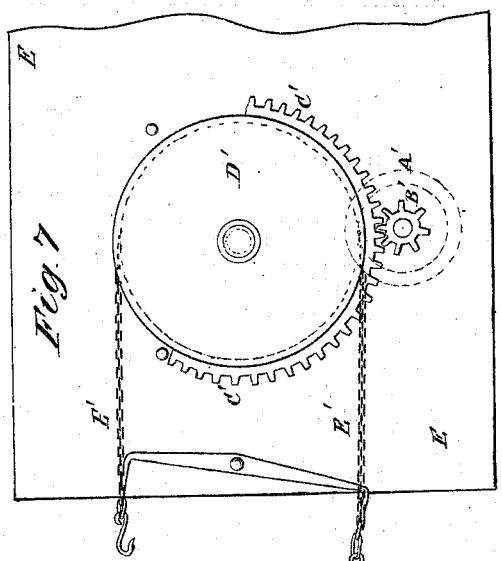
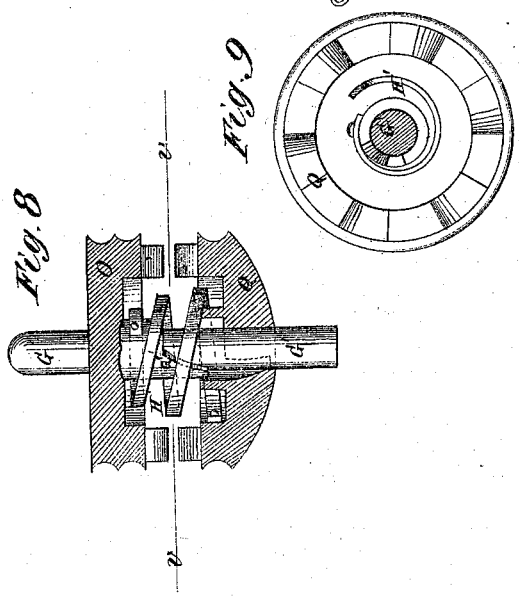
Witnesses:
A. W. Almqvist
Geo. W. Mabee
Inventor:
Albert A. Weidemeyer
Per Munn & Co
Attorneys.

122,419

UNITED STATES PATENT OFFICE.

ALBERT A. WEIDEMEYER, OF WILLIAMSBURG, NEW YORK.

IMPROVEMENT IN CAR-BRAKES.

Specification forming part of Letters Patent No. 122,419, dated January 2, 1872.

Specification describing a certain Improvement in Double Clutch-Brake for Railroad Cars, invented by ALBERT A. WEIDEMEYER, of Williamsburg, in the county of Kings and State of New York.

Figure 1, Sheet 1, is a top view of a pair of trucks to which my improved brakes have been attached, parts being broken away to show the construction. Fig. 2, Sheet I, is a detail view of a link of the coupling-chains. Fig. 3, Sheet I, is a detail longitudinal section of the same. Fig. 4, Sheet I, is a detail cross-section of the same taken through the line $x$ $x$, Fig. 2. Fig. 5, Sheet I, is a detail cross-section of the same taken through the line $y$ $y$, Fig. 2. Fig. 6, Sheet II, is a detail longitudinal section taken through the line $z$ $z$, Fig. 1. Fig. 7, Sheet II, is a detail under-side view of the part of the apparatus to be attached to the engine. Fig. 8, Sheet II, is a detail vertical section of the clutch. Fig. 9, Sheet II, is a detail horizontal section of the same taken through the line $v$ $v$, Fig. 8, looking downward. Fig. 10, Sheet II, is the same section as Fig. 9, but looking upward.

My invention has for its object to furnish an improved double clutch-brake for attachment to railroad cars, which shall be so constructed that the brake may be applied to all the cars of the train from the engine, and either quickly or more slowly, as may be desired; and it consists in the construction and combination of various parts, as hereinafter more fully described.

A are the wheels; B are the axles; C are the truck-frames; D represents the car-frame; and E represents the engine, about the construction of which parts there is nothing new; F are the brake-bars, to which the brake-shoes are attached, and which are held away from the wheels by springs, and supported from the truck-frames by links or chains in the ordinary manner. To the center of the outer brake-bar F of each truck is pivoted two levers, G H. To the lower end of the lever G is pivoted the outer end of a rod or chain, I, the other end of which is pivoted to the center of the inner brake-bar of the truck, so that by operating the levers G the brakes will be applied to the wheels. To the lower end of the other lever H is pivoted the end of a short rod or chain, J, the other end of which is pivoted to the end of an elastic clamp or strap, K, coiled around the outer axle of the truck. The other end of the clamp K is connected with a similar clamp, K, coiled around the other axle of the said truck by a rod or chain, L. The other end of the second or inner clamp K is connected with the center of the inner brake-bar F, by a short rod or chain, M, so that by operating the lever H the brakes will be applied to the wheels, and at the same time the clamps K will be drawn tightly around the axles. To the upper end of each of the levers G is attached the outer end of a chain, N, the inner ends of which chains are attached to the opposite sides of the upper part O of the clutch, so that the revolution of the upper part O of the clutch in the direction indicated by arrow 1 will operate both of the levers G and apply the brakes. To the upper end of each lever H is attached the outer end of a chain, P, the inner ends of which chains are attached to the opposite sides of the lower part Q of the clutch O Q, so that by turning the lower part of the clutch in the direction of arrow 2, the levers H will be operated to apply the brakes. R are chains, the ends of which are attached to the opposite sides of the upper part O of the clutch O Q, and which pass around guide-pulleys S, pivoted to the car-frame D towards the opposite sides and opposite ends, respectively, of the said car-frame. The two chains R may be made as a continuous chain, if desired. The outer parts of the chains R, at a little distance from the pulleys S, are connected respectively with the rods T, which extend longitudinally beneath the car-frame D near its opposite sides, and work longitudinally in guides attached to said frame D. By this construction, by moving either of the rods T in the direction of arrows 3, the upper part O of the clutch O Q, will be turned in the direction of arrow 1, to operate the levers G and apply the brakes. This movement of the rods T may be given from the engine in the manner hereinafter described, or by means of the ordinary capstans U, which are pivoted to the platforms of the cars in the ordinary manner, and which are connected with the said rods T by short chains V. To the car-frame D near each end is pivoted a short lever, W, to the ends of which are attached short chains X, which, in the case of the rear end of the rear car are hooked into eyes formed upon or attached to the rods T to give a point of resistance to the said rods. To one end of each of the levers W is attached one end of a chain, Z, the other ends of which chains are attached to the opposite sides of the lower part Q, of the clutch O Q. To the other ends of the levers W are attached the ends of the chains Y, which pass the clutch O Q upon its opposite sides, and the other ends of which are attached to the chains N that lead to the levers G. To the engine E is pivoted a capstan, A', to the lower end of which is attached a small gear-wheel, B', the teeth of which mesh into the teeth of the large gear-wheel C', attached to or formed upon the large pulley or drum D', pivoted to said engine, and around which is wound and to which is attached a chain, E', the ends of which are connected with the ends of the rods T, so that by turning the capstan A' in one direction one of the rods T will be operated, and by turning the capstan A' in the other direction, the other rod T will be operated. The ends of the chain E' are connected with the ends of the rods T, and the adjacent ends of the rods T of the various cars of the train are connected by short coupling-chains F'. Each link of the coupling-chains F' is made in two parts, which are bent together, so that the middle parts of said posts form the eyes or ends of the link, and the end parts of said posts form the body of the link. The inner sides of the parts of the link are recessed to form a cavity to receive rubber blocks or other suitable springs. Upon the inner sides of the ends of the posts of the link F are formed semicircular shoulders or flanges for the ends of the inclosed springs to rest against. Upon the ends of the parts of the links F are formed lugs, which pass out through slots in the bodies of the other part to serve as stops to limit the movement of the parts upon each other, and also lock said parts together. Upon the under side of the upper part O and upon the upper side of the lower part Q of the clutch O Q are formed teeth, which, when the said parts are pushed together, interlock and cause the said parts to move together. The upper part O is attached to a center pin or shaft, G', which passes through the center of the lower part Q. Upon the upper part O is formed or to it is attached a tongue or lug, O', which, when the said parts are brought into proper position for the teeth of said parts to interlock, and when said parts are forced together, enters a groove or socket in the lower part Q, but which, when the said parts are in any other position, prevents said parts from being forced or jarred together. The parts O Q may be forced together when required by a cam or lever, which is not shown in the drawing. The adjacent sides of the parts are recessed to receive the spring H', by which the said parts are forced and held apart, and by which the said parts are brought into proper relative position when released after being operated.

By this construction the engineer, by throwing parts O Q of the clutch together, and operating the capstan A' in the direction to draw the rods T in the direction indicated by arrow 3, can apply the brakes quickly to all the cars of the train. By operating the capstan A' in the other direction, without throwing the parts O Q of the clutch together, the brakes will be applied more slowly.

Having thus described my invention, I claim as new and desire to secure by Letters Patent—

1. The clutch O Q O' G' H', constructed and operating substantially as herein shown and described, to adapt it for use in working a car-brake, as and for the purpose set forth.

2. The combination of the two levers G H, connecting-rod I, connecting-rods J L M, clamps K, chains N P, clutch O Q O' G' H', chains R and F, guide-pulleys S, with each other, and with the sliding rods T and brake-bars F, substantially as herein shown and described, and for the purposes set forth.

3. The combination of the levers W and detachable chains X, with the frame D of the car, and with the sliding rods T, by which the brakes are operated, substantially as herein shown and described, and for the purpose set forth.

4. The combination of the chains Y Z, with the levers W, connected with the sliding rods T, the clutch O Q O' G' H', and the chains N, connected with the lever G, substantially as herein shown and described, and for the purpose set forth.

5. The combination of the capstan A', attached to the engine, the gear-wheels B' C', pulley or drum D', and chain E', with the sliding rods T, by which the brakes are operated, substantially as herein shown and described, and for the purpose set forth.

The above specification of my invention signed by me this 7th day of November, 1871.

ALBERT A. WEIDEMEYER.

Witnesses:
JAMES T. GRAHAM,
T. B. MOSHER.